Feb. 3, 1970    M. BROMBERG    3,493,672
FLUID TIGHT CONNECTOR
Filed June 24, 1968    2 Sheets-Sheet 1

INVENTOR.
MENASHE BROMBERG
BY
ATTORNEY

Feb. 3, 1970         M. BROMBERG         3,493,672
FLUID TIGHT CONNECTOR
Filed June 24, 1968                  2 Sheets-Sheet 2

INVENTOR.
MENASHE BROMBERG
BY *David Senkne*

ATTORNEY

United States Patent Office 3,493,672
Patented Feb. 3, 1970

3,493,672
FLUID TIGHT CONNECTOR
Menashe Bromberg, West Orange, N.J., assignor to
Thomas & Betts Corporation, Elizabeth, N.J., a
corporation of New Jersey
Filed June 24, 1968, Ser. No. 739,374
Int. Cl. H02g 15/02, 15/08, 3/18
U.S. Cl. 174—78                    15 Claims

ABSTRACT OF THE DISCLOSURE

The disclosure is directed to a fluid tight connector for assembling a sheathed flexible metallic raceway to an electrical enclosure. The connector consists of a gland subassembly made up of a gland, a sealing ring and a grounding member. The gland is an externally, hexagonal member having an axial passage therethrough with a first stop located adjacent one end of the axial passage and a second stop intermediate the ends thereof. A resilient sealing ring is snap positioned into the gland between the first and second stops. At the end of the gland, remote from the sealing ring, are internal threads for receipt therein of an externally threaded portion of the body member. Adjacent the internally threaded portion of the gland is an internally threaded portion of the sealing ring for accepting therein the threaded portion of the grounding member. By assembling these components as described; that is, snapping the sealing ring within the gland and then screwing the grounding member into the sealing ring the subassembly is completed. The assembly of the connector is completed by assembling the gland subassembly to a body member. The body member, in addition to having external threads for receipt of the gland, has a second portion which is externally threaded for coupling the connector to an electrical enclosure.

BACKGROUND OF THE INVENTION

Field of the invention

The invention is directed to the field of coupling raceways to electrical enclosures and more particularly to coupling sheathed flexible metallic raceways to electrical enclosures in a manner which provides a fluid tight joint and which provides for the grounding of the metallic raceway to the electrical enclosure.

Description of the prior art

Prior art fluid tight connectors for coupling flexible raceways to electrical enclosures require the same basic elements as above recited with respect to the instant invention. They required a gland, a sealing ring, a grounding member and a connector body. Each of these units is separate and requires assembly at the time of installation of the raceway to the electrical enclosure. In addition, the fastening of the units of the connector together generally caused the destruction of the sealing ring such that if it were necessary to replace the raceway it was necessary to replace at least the sealing ring portion of the connector, if not other components as well. Additionally, the portion above described as the gland subassembly could not be created and thus at the time of installation three separate components; namely, the gland, sealing ring and grounding member must each be installed. Care must be taken to see that each of the components, is in its proper position, to facilitate connection of the raceway to an electrical enclosure.

SUMMARY OF THE INVENTION

The present invention seeks to overcome the difficulties noted above with respect to prior art devices by providing a fluid tight connector which can be partially preassembled at the factory by creating a gland subassembly of the three main portions of the connector and the assembly completed at the site of the connector use. This is accomplished by means of sealing rings which are resilient and can be, because of their design, placed and retained between stops provided therefore to assemble the sealing ring to the gland. Further, screw threads provided in the sealing ring are made to receive the threaded portion of a grounding member in such a manner that the parts of the gland subassembly will not be separated and such that it will not interfere with the installation of the gland subassembly to the end of a sheathed flexible metallic raceway.

Due to the manner in which the coupling is achieved between the sealing ring and the sheath of the raceway the sealing ring is readily removable from the raceway permitting reuse of the connector, if desired, without destruction either to the sealing ring or to the raceway itself. Further, due to the manner in which the gland subassembly is maintained, it is possible, without difficulty, to remove the raceway from one electrical enclosure application and assemble it to another. Further, because of the arranngement of the components, a fluid type seal is provided between each of the component portions, and between the connector and the raceway itself. Additionally, because of the manner in which the sealing ring and the internal threading for receipt of the body are arranged it is possible to obtain a gland which is smaller in overall dimension, thus permitting more of these connectors to be used in a given area than was possible with prior art devices which required greatly oversized glands. It is therefore an object of this invention to provide an improved fluid tight connector.

It is still another object of this invention to provide an improved fluid tight connector which provides a gland subassembly which may be assembled prior to the use of the connector and permits ease of reuse of the connector.

It is still another object of this invention to provide an improved fluid tight connector wherein a resilient sealing ring may be permanently retained within the body of a gland.

It is still another object of this invention to provide an improved fluid tight connector having a gland and sealing ring wherein the sealing ring has internal threads for receipt therein and retaining thereby of a grounding member.

It is still another object of this invention to provide an improved fluid tight connector having a gland subassembly which facilitates the assembly of the connector to a raceway.

It is yet another object of this invention to provide an improved fluid tight connector having a grounding member which may be readily inserted between the convolutions of a sheath flexible metallic raceway and which provides a sealing flange for sealing the gland and body members together.

It is another object of the invention to provide an improved fluid tight connector wherein all component portions thereof are reusable.

Other objects and features of the invention will be pointed out in the following description and claims and illustrated in the accompanying drawings, which disclose, by way of example, the principles of the invention, and the best mode which has been contemplated for carrying them out.

BRIEF DESCRIPTION OF THE DRAWINGS

In the figures.

Similar elements will be given similar reference characters in each of the respective figures.

DESCRIPTION OF THE PREFERRED EMBODIMENT

Figure 1:
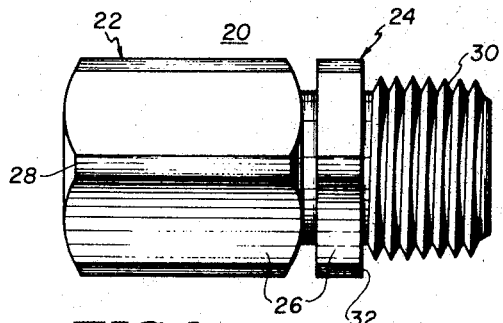
FIG. 1 is a side elevation of a fluid tight connector constructed in accordance with the concepts of the invention.
Figure 2:
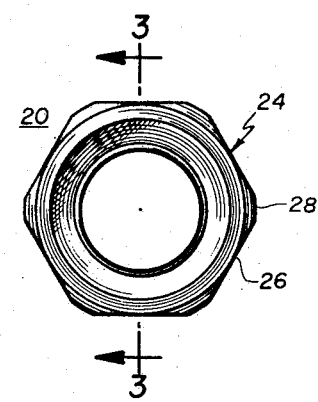
FIG. 2 is a front elevation of the connector of FIG. 1.
Figure 4:
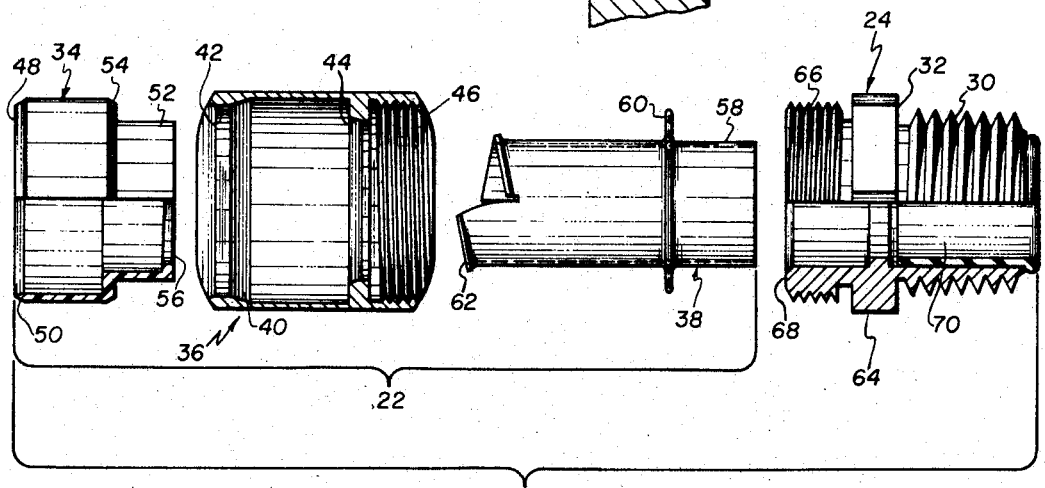
FIG. 4 is an exploded side elevation, partially in section, of the connector of FIG. 1.

Turning now to FIGS. 1, 2 and 4 there is shown a fluid tight connector 20 constructed in accordance with the concepts of the invention. Connector 20 consists of a gland subassembly 22 and a body portion 24. The outer surfaces of the gland subassembly 22 and the body 24 are each hexagonal in shape having six wrench flats 26. The corners 28, between the wrench flats 26, have been rounded or otherwise smoothed off to prevent possibility of injury to either personnel or to the raceways to be coupled thereto. Although a hexagonal shape has been shown for both the gland subassembly 22 and the body 24 it should be understood that any other convenient shape such as circular, octagonal, etc. may be employed. Body portion 24 terminates in a tapered externally threaded portion 30 for insertion in the knock-out of an electrical enclosure. Body portion 24 will be positioned in the knock-out until the shoulder 32 of the body portion 24 abuts the wall of the electrical enclosure and a washer and a nut (not shown) is then tightened upon the threaded portion 30 to securely fasten the connector 20 to the electrical enclosure. As is evident, in FIG. 2, an axial passage extends through both the gland subassembly 22 and the body portion 24. The details of the various portions of the axial passage will be described in greater detail with respect to FIG. 4 below.

Turning now to FIG. 4 there is shown an exploded side view of the connector 20 of FIG. 1, partially in section, to expose the details of the component portions. Gland subassembly 22 is composed of a sealing ring 34, the gland 36 and a grounding member 38. Turning first to the gland 36, it can be seen that axial passage 40 has a number of constrictions therein. A first constriction is a cam surface, or stop, 42 at a first end of the gland 36. A second stop 44 is provided intermediate the ends of the gland 36. The portion of the gland 36 beyond the stop 44 to the right of FIG. 4 has an internally threaded area 46 for receipt therein of a cooperating externally threaded portion of the body 24 as will be described below.

Sealing ring 34 is constructed of a resilient material having a preshaped form consisting of a larger diameter portion 48 arranged to nest between the cam 42 and the stop 44 of the gland 36. The leading edge 50 of the sealing ring 34 is tapered to facilitate movement of the front surface of the sealing ring 34 with respect to the cam 42 in a manner to be described below. The second portion of the sealing ring 34 is the portion 52 having a smaller diameter than that of the portion 48. The trailing surface of the portion 48 is tapered as at 54 to facilitate positioning of the sealing ring within the gland 36. A one pitch thread 56, a portion of which is shown in the lower right hand portion of the sealing ring 34, is provided for accepting the threaded portion of the ground member 38 as will be described below.

Figure 5:
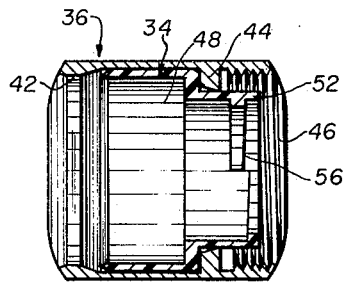
FIG. 5 is a side elevation, in section, showing the assembly of the sealing ring and gland of FIG. 4.

Turning briefly now to FIG. 5 the assembly of the gland 36 and the sealing ring 34 is shown. As can be seen from FIG. 5 the sealing ring 34 has been forced into the position between the stops 42 and 44 such that the portion 48 of the sealing ring 34 is retained between the stops 42 and 44. The portion 52 is allowed to overlap the threaded area 46 of the gland 36. However, due to the differences in size of portion 52, and gland 36, there will be no interference between the outer surface of portion 52 of sealing ring 34 and the threaded portion 46 of the gland 36. During the insertion of the sealing ring 34 into the gland 36, the tapered portion 54 and the leading edge of cam 42 facilitates the deforming of the sealing cone 34 to permit its being positioned as shown in FIG. 5. Once the distorting effects of the stop 42 have been removed, the sealing ring 34 is permitted to expand to occupy the position shown in FIG. 5.

The next portion of the gland subassembly 22 to be assembled is the ground member 38. Ground member 38 has a generally cylindrical body portion having a pilot hub 58 which can be used to cause the engagement of the threaded portion of the ground member 38 into the threaded portion 56 of the sealing ring 34 and for later insertion between the convolutions of a flexible metallic raceway placed within the sealing ring 34. Extending about the periphery of the ground member 38 and spaced from the ends thereof is a flange 60 which will be described below for the application of axial forces to the sealing ring 34 to cause it to grasp the raceway and also cause a moisture seal about the flexible metallic raceway. Also the flange 60 provides a fluid seal between the gland 36 and the body member 24. At the opposite end of the ground member 34 is a thread 62. This thread 62 may be formed by upturning the end of material of the ground member 38 itself or by adding an additional external rib or ridge thereupon. The thread 62 provides substantially one thread pitch and is of sufficient height and of minimal thickness to permit it to seat itself between the convolutions of the inner wall of a flexible metallic raceway. Ground member 38 will be positioned so that the thread 62 will engage the thread portion 56 of the sealing ring 34 and permit the ground member 38 to be screwed into a sealing ring 34 to a depth equal to the width of portion 52 of the sealing ring 34. This prevents unwanted separation of the ground member 38 from the gland assembly 22 and in no way impedes the later entrance of a sheathed flexible metallic raceway into the sealing ring 34.

The final member of the connector 20 is the body 24 which terminates in a tapered thread 30 which will be inserted through a knock-out in an electrical enclosure and be fastened to the enclosure by means of a nut (not shown) screwed over threaded portion 30 trapping the wall of the electrical enclosure between such nut and the shoulder 32 of the body 24. Intermediate the ends of the body 24 is a hexagonal region composed of six wrench flats 64 for tightening the body to the electrical enclosure and for aiding in the assembly of gland subassembly 22 to the body 24. Although the shape shown is that of a hexagon any other convenient shape for the wrench flats 64 may be provided as are desired. The opposite end of the body 24 is a threaded portion 66 which terminates in a sealing surface 68. When assembled the sealing surface 68 of the body 24 will engage the rear portion of the flange 60 of the grounding member 38. Axial passage 70 is provided through the entire length of the body 24.

Figure 6:
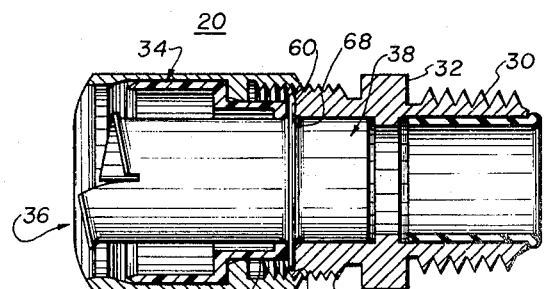
FIG. 6 is a side elevation, partially in section, of the connector of this invention fully assembled but prior to use.

Turning now to FIG. 6 there is shown an assembly of the body portion 24 and the gland subassembly 22 to permit shipping of the connector 20 but not in the position which the connector components will finally occupy when the connector is assembled to a sheathed flexible metallic raceway. As is shown in FIG. 6, grounding member 38 has been screwed into the thread 56, of portion 52 of the sealing ring 34, and advanced completely through section 52 and then pushed through the portion 48 of the sealing ring 34 until the flange 60 of the ground member 38 engages the rear surface of portion 52 of the sealing ring 34. Body 24 will then be caused to engage the gland subassembly 22 such that the threaded portion 66 engages the threaded portion 46 of the gland 36. The body 24 is tightened to the point that the sealing face 68 of the body 24 rests against the flange 60 and the opposite side of the flange 60 rests against the back face of portion 52 of sealing ring 34 without applying a significant amount of axial force to the sealing ring 34. In this condition, the connector 20 may then be boxed and shipped to a point where it will be employed.

Figure 3:
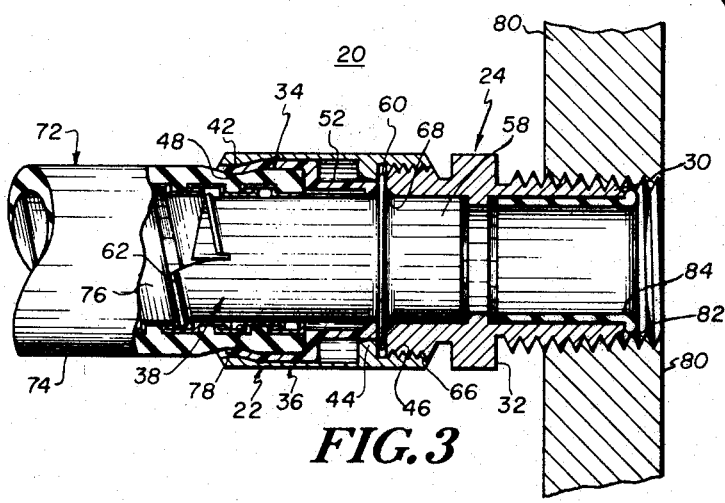
FIG. 3 is a side elevation, in section of the connector of FIG. 2 taken along the lines 3—3 and showing the connector partially installed in the wall of an electrical enclosure.
Figure 7:
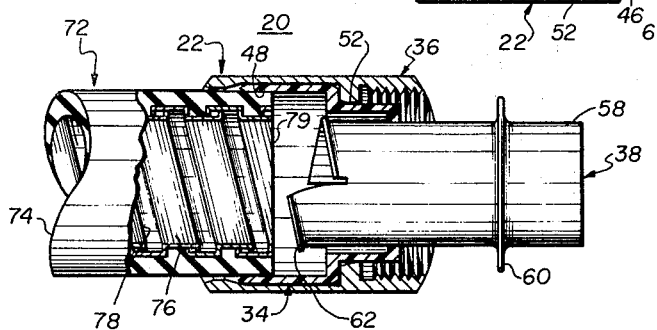
FIG. 7 is a side elevation, partially in section, showing the installation of a connector constructed in accordance with the concepts of this invention to a sheathed flexible metallic raceway.
Figure 8:
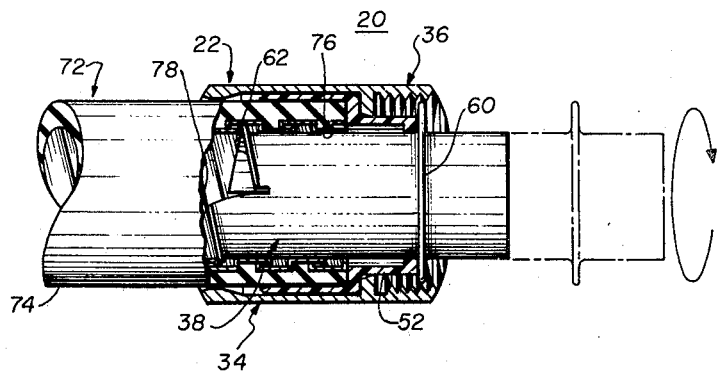
FIG. 8 shows further details of the installation of the present connector to the sheathed flexible metallic raceway and represents a further stage of the assembly depicted in FIG. 7.

Turning now to FIGS. 7 and 8 there is shown the assembly of a gland subassembly 22 with a sheathed flexible metallic raceway 72. The raceway 72, as shown, has a sheath 74 which insulates and protects the raceway. The raceway 72 has a series of convolutions 76 with spacing 78 between individual convolutions of the raceway. The body portion 24, not shown in FIGS. 7 and 8, will be removed from the connector 20 assembly as shown in FIG. 6 and will be installed to the wall of an electrical enclosure 80 as is shown in FIG. 3. As is shown in FIG. 3 the tapered thread portion 30 has been screwed into a threaded aperture 82 in the wall 80 of the electrical enclosure. However, it should be understood that the wall 80 may have an unthreaded knock-out, or aperture, in which instance the body 24 is inserted through the aperture or knock-out in the wall 80 until shoulder 32 of body 24 contacts wall 80 and a sealing O-ring and nut (not shown) will be fastened upon the threaded portion 30 to engage the wall 80 of the electrical enclosure between the shoulder 32 of the body 24 and the ring nut combination. It should be understood that in most instances the body 24 will be assembled to the wall 80 of the electrical enclosure prior to the assembly of the gland subassembly 22 to the body 24. It is, however, possible to assemble a completely assembled connector to the wall 80 of an electrical enclosure if such is desired.

Returning now to FIGS. 7 and 8 with the body 24 removed from the connector 20, the ground member 38 may be partially withdrawn from portion 48 until thread 62 engages portion 52 of the sealing ring 34 and the sheathed flexible metallic raceway 72 inserted within the axial passage of the portion 48 of the sealing ring 34. At this time the ground member 38 is rotated by means of the pilot hub 58 to cause the thread 62 to engage the spacings 78 between the convolutions 76 of the raceway. This will cause the engagement of the thread 62 with the spacings 78 and will also cause the raceway 72 to be drawn further into the portion 48 of the sealing ring 34 until contact is made between the leading edge 79 of the raceway 72 and the connecting wall between portions 48 and 52 of the sealing ring 34. As is shown in FIG. 8 the grounding member 38 has been fully engaged with the raceway 72 such that thread 62 of the grounding member 38 is now locked within the spacings 78 between adjacent convolutions 76. Further, the flange 60 is now in a position engaging the trailing edge of portion 52 of sealing ring 34. The assembly of gland subassembly 22 to the raceway 72 has now been completed. It should be noted that although the ground member 38 is fixedly connected to the raceway 72 the gland 36 is free to rotate and therefore it may be tightened upon the body 24 without in any way causing the twisting or distortion of the raceway 72. It should also be noted that in the assembly, as shown in FIG. 7, the alignment established by the position of the flexible raceway 72 as it enters the sealing ring 34, and the position of the grounding member 38 held by the portion 52 of the sealing ring 34, assures a simple insertion of the ground member 38 into the flexible raceway 72 and thus acts as a pilot for such insertion.

Turning now to FIG. 3, the complete assembly of the connector 20 thereby coupling the flexible raceway 72 to the electrical enclosure wall 80 is shown. Rotating the gland 36, screw threaded portion 46 thereof is caused to engage and tighten upon the threaded portion 66 of the body 24. Such action continues until the sealing surface 68 of the body 24 engages the flange 60 of the grounding member 38. Continued application of rotational force to the gland 36 causes the sealing face 68 of the body 24 to force the flange 60 of the grounding cone against the trailing face of the portion 52 of the sealing ring 34 causing edge 50 of portion 48 to deform following the cam surface of the stop 41. This provides a seal about the flexible raceway 72 at its entry area into the connector 20. Further, the deforming of the sealing ring 34 causes it to seat itself in the spaces 78 in between adjacent convolutions 76 of the raceway 72 providing some grasping action to hold the raceway 72 into the connector 20 and in addition to providing the seal. Such gripping action is in addition to the main gripping force provided by the seating of the thread 62 of the grounding member 38 in the spacings 78 between adjacent convolutions 76 of the flexible raceway 72. The further movement of the gland 36 is terminated when the flange 60 contacts the stop 44 preventing further movement of the ground member 38 and the gland subassembly 22.

It should be noted that the holding power of the connector 20 with respect to the raceway 72 is accomplished firstly by means of the interconnection between the thread 62, of the ground member 38, and the spacings 78 of the raceway 72, and further by the sealing and grasping effects of the leading edge of portion 48 of sealing ring 34. The grounding member 38 is held firm by flange 60 engaging stop 44 and the engagement of sealing surface 68 against flange 60. Additionally, sealing has been created firstly between the connector 20 and the sheath of the sheath of the raceway 72, by means of the deformed leading edge 50 of the sealing ring 34, and secondly between the respective members; that is, the gland subassembly 22 and the body 24 as a result of the trailing portion of portion 52 of the sealing ring 34 and flange 60 of the grounding member 38. Grounding is accomplished by the metal to metal contact of the thread 62 with the spaces 78 between the convolution 76 of the raceway 72, the ground member 38 and the pilot hub 58 of the ground member 38 which contacts the walls about the axial passage 70 of the body 24. If desired, a throat insulator; such as 84, may be placed in the body 24 at the portion containing the tapered thread 30 thereabout. This will prevent any damage to conductors passed through the flexible raceway 72 through the connector 20 into the electrical enclosure.

While there have been shown and described and pointed out the fundamental novel features of the invention as applied to the preferred embodiments, it will be understood that various omissions and substitutions and changes of the form and details of the device illustrated and in its operation may be made by those skilled in the art, without departing from the spirit of the invention.

The embodiments of the invention in which an exclusive property or privilege is claimed are defined as follows:

1. In a fluid tight connector a gland subassembly comprising: a gland having an axial passage therethrough; a sealing ring having an axial passage therethrough proportioned to fit within the axial pasage of said gland and be retained therein; a helical thread at one end of the axial passage of said sealing ring; and a grounding member having an axial passage therethrough; said grounding member having a flange about its outer periphery intermediate its ends and at least one screw thread at one of its ends whereby said screw thread may be made to engage with said helical thread in said sealing ring to retain said sealing ring, grounding member and gland in assembly.

2. A gland subassembly, as defined in claim 1, wherein said gland has a first stop member adjacent a first end of its axial passage and a second stop member in said axial passage intermediate the ends of said gland whereby upon insertion of said sealing ring in said gland, said sealing ring is retained by said first and second stop members.

3. A gland subassembly, as defined in claim 2, wherein said gland's external surface is in the form of a hexagon, each side of which is flat.

4. A gland subassembly, as defined in claim 2, wherein the axial passage of said gland adjacent a second end has an internal thread.

5. A gland subassembly, as defined in claim 2, wherein said first stop member is a cam surface whereby the application of axial forces to said sealing ring from the direction of the threaded end of said gland causes the end of said sealing ring adjacent said cam surface to follow said cam surface and grasp an article inserted into said axial passage of said sealing ring and provide a fluid seal thereabout.

6. A gland subassembly, as defined in claim 2, wherein said sealing ring has a first portion proportioned to fit between said first and second stop members to be retained thereby and a second portion proportioned to pass beyond said second stop member; said sealing ring being of resilient material whereby it may be deformed to pass said first stop member and return to its preformed shape to be retained between said first and second stop members.

7. A gland subassembly, as defined in claim 6, wherein said helical thread is at least one complete thread pitch and said helical thread is formed by a raised ridge above the surface of the axial passage of said sealing ring.

8. A gland subassembly, as defined in claim 2, wherein said one screw thread at the end of said grounding member is an outwardly extending rib continuous with said end, said grounding member arranged to be screwed through the sealing ring and into the convolutions of a raceway inserted into said sealing ring until said flange engages said second stop member.

9. A gland subassembly, as defined in claim 8, wherein the portion of the grounding member between the flange and the nonthreaded end provides a hub to permit said grounding member to be screwed into said sealing ring and beyond.

10. The method of making a gland subassembly comprising the steps of forcing a flexible sealing ring into a gland and threading a grounding member into said sealing ring whereby said grounding member, said sealing ring and gland are retained as an assembly.

11. A fluid-tight connector, as defined in claim 1, wherein said gland has an internal thread at an end of its axial passage adjacent the helical thread of said sealing ring; body member having an axial passage therethrough and having an external thread along the outer surface of a first portion of said body member proportioned to engage with the internal thread of said gland; the tightening of said gland and body member applying axial forces to said grounding member and said sealing ring to cause said sealing ring to grasp articles placed within the axial passage of said sealing ring and provide a fluid seal thereabout.

12. A fluid-tight connector, as defined in claim 2, wherein said gland has an internal thread at an end of its axial passage adjacent the helical thread of said sealing ring; a body member having an axial passage therethrough and having an external thread along the outer surface of the first portion of said body member proportioned to engage with the internal thread of said gland; said first stop member of said gland is a cam surface; the tightening of said gland and body member applying axial forces to said grounding member and to said sealing ring causing the end of said sealing ring adjacent said cam surface to follow said cam surface and grasp an article inserted into said axial passage of said sealing ring and provide a fluid seal thereabout.

13. A fluid tight connector, as defined in claim 11, wherein a second portion of the outer surface of said body member has a tapered external thread for coupling the connector to an electrical enclosure.

14. A fluid tight connector, as defined in claim 12, wherein a second portion of the outer surface of said body member has a tapered external thread for coupling the connector to an electrical enclosure.

15. A fluid-tight connector for coupling a sheathed flexible metallic raceway to an electrical enclosure comprising: a metallic connector body having an axial passage therethrough, said body having a threaded first end portion for coupling said connector to an electrical enclosure and a threaded second end portion for receipt thereon of a gland; a gland having an axial passage therethrough in alignment with the passage in said body; said gland having at a first end of its passage an internal thread for mating with the thread of said threaded second end portion of said body; said gland having a first stop at the second end of its passage and a second stop intermediate said passage ends; a sealing ring having a first portion proportioned to be retained between said first and second stops and a second portion; said sealing ring having an axial passage therethrough; said sealing ring having an outside diameter proportioned to provide a force fit between said sealing ring and said gland when said gland is forced into the axial passage of said gland; said second portion of said sealing ring extending over a portion of the internal thread at said first end of said gland passage; said second portion of said sealing ring having thread at its end adjacent said gland internal thread; a grounding member having an axial passage therethrough; said grounding member having a rib at one end thereof to engage the thread of said second portion of said sealing ring to retain said grounding member to said assembled gland and sealing ring; a flange upon said grounding member; the assembly of said gland to said body after insertion of a flexible raceway into said first portion of said sealing ring and the screwing of said rib between the internal convolutions of said raceway causing the application of axial forces to said grounding ring and said sealing ring to cause said sealing ring to be distorted by said first stop and grasp the sheath of the flexible metallic raceway and provide a fluid seal thereabout; said assembly being terminated upon the contact of said ground member flange with said second stop whereby a fluid-tight coupling is accomplished.

References Cited

UNITED STATES PATENTS

| | | | |
|---|---|---|---|
| 3,393,267 | 7/1968 | Busse | 285—249 X |
| 3,227,803 | 1/1966 | Gohs | 174—78 |

LARAMIE E. ASKIN, Primary Examiner

D. A. TONE, Assistant Examiner

U.S. Cl. X.R.
174—65; 285—161